United States Patent
Ambe et al.

(10) Patent No.: US 11,404,767 B2
(45) Date of Patent: Aug. 2, 2022

(54) ANTENNA APPARATUS

(71) Applicant: YOKOWO CO., LTD., Kita-ku Tokyo (JP)

(72) Inventors: Tomio Ambe, Tomioka (JP); Hirotoshi Mizuno, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 374 days.

(21) Appl. No.: 16/642,384

(22) PCT Filed: Aug. 29, 2018

(86) PCT No.: PCT/JP2018/032016
§ 371 (c)(1),
(2) Date: Feb. 27, 2020

(87) PCT Pub. No.: WO2019/044924
PCT Pub. Date: Mar. 7, 2019

(65) Prior Publication Data
US 2020/0350663 A1 Nov. 5, 2020

(30) Foreign Application Priority Data

Aug. 30, 2017 (JP) .............................. JP2017-165359
Aug. 30, 2017 (JP) .............................. JP2017-165360

(51) Int. Cl.
*G01S 19/03* (2010.01)
*H01Q 1/32* (2006.01)
(Continued)

(52) U.S. Cl.
CPC ............. *H01Q 1/3275* (2013.01); *H01Q 1/24* (2013.01); *H01Q 1/42* (2013.01); *H04B 1/3822* (2013.01);
(Continued)

(58) Field of Classification Search
CPC .......... H01Q 1/3275; H01Q 1/24; H01Q 1/42; H04B 1/3822; H04L 67/12; H04L 12/46; H04L 12/28
See application file for complete search history.

(56) References Cited

U.S. PATENT DOCUMENTS

2015/0229500 A1   8/2015   Suzuki et al.
2017/0054204 A1   2/2017   Changalvala et al.

FOREIGN PATENT DOCUMENTS

JP   10-274535 A   10/1998
JP   11-337348 A   12/1999
(Continued)

OTHER PUBLICATIONS

Japanese Notice of Reasons for Refusal dated Jan. 17, 2018, issued in corresponding Japanese Patent Application No. 2017-165359.
(Continued)

*Primary Examiner* — Joseph J Lauture
(74) *Attorney, Agent, or Firm* — Xsensus LLP

(57) ABSTRACT

An antenna apparatus includes a signal processing section having a first processing unit for calculating position information of a vehicle to which a first antenna element is attached, a second processing unit for performing mobile communication, a third processing unit for receiving information from outside of the vehicle and transmitting information that pertains to the vehicle, and a fourth processing unit for receiving a digital broadcast; an antenna element section having the first antenna element to a fourth antenna element; and a transceiver unit connected to a gateway ECU of the vehicle through an onboard LAN. The first antenna element to the fourth antenna element are covered with an antenna case. The first to fourth processing units are accommodated in a housing arranged at a position closer to the antenna element section than the gateway ECU.

14 Claims, 4 Drawing Sheets

(51) Int. Cl.
*H01Q 1/24* (2006.01)
*H01Q 1/42* (2006.01)
*H04B 1/3822* (2015.01)
*H04L 67/12* (2022.01)
*H01Q 7/00* (2006.01)
*H01Q 9/04* (2006.01)
*H01Q 9/16* (2006.01)
*H04L 12/28* (2006.01)
*H04L 12/46* (2006.01)

(52) U.S. Cl.
CPC ............... *H04L 67/12* (2013.01); *H01Q 7/00* (2013.01); *H01Q 9/0407* (2013.01); *H01Q 9/16* (2013.01); *H04L 12/28* (2013.01); *H04L 12/46* (2013.01)

(56) References Cited

FOREIGN PATENT DOCUMENTS

| | | | |
|---|---|---|---|
| JP | 2000-55667 A | | 2/2000 |
| JP | 2000-90396 A | | 3/2000 |
| JP | 2000-299890 A | | 10/2000 |
| JP | 2000-348299 A | | 12/2000 |
| JP | 2002-330377 A | | 11/2002 |
| JP | 2003-046536 | * 2/2003 | ............. H04L 12/40 |
| JP | 2003-046536 A | | 2/2003 |
| JP | 2005-328283 A | | 11/2005 |
| JP | 2006-128807 A | | 5/2006 |
| JP | 2008-174098 A | | 7/2008 |
| JP | 2009-90396 A | | 4/2009 |
| JP | 2010-35076 A | | 2/2010 |
| JP | 2010-273148 A | | 12/2010 |
| JP | 2011-046233 A | | 3/2011 |
| JP | 2011-162147 A | | 8/2011 |
| JP | 2011-199547 A | | 10/2011 |
| JP | 2012-127789 A | | 7/2012 |
| JP | 2014-42115 A | | 3/2014 |
| JP | 2014-158208 A | | 8/2014 |
| JP | 2014-236248 A | | 12/2014 |
| JP | 2015-175823 A | | 10/2015 |
| JP | 2015-184002 A | | 10/2015 |
| JP | 2016-172460 A | | 9/2016 |
| JP | 2017-120984 A | | 7/2017 |
| WO | 2006/077638 A1 | | 7/2006 |
| WO | 2014/034068 A1 | | 3/2014 |
| WO | 2017/033486 A1 | | 3/2017 |

OTHER PUBLICATIONS

Japanese Argument—Written Opinion dated Feb. 21, 2018, issued in corresponding Japanese Patent Application No. 2017-165359.
Japanese Notice of Reasons for Revocation dated Jan. 31, 2019, issued in corresponding Japanese Patent Application No. 2017-165359.
Hitachi News Release; URL:http:/[ Hitachi, Ltd., news release, and ]/www.hitachi.co.jp/New/cnews/month/2016/04/0428.html, Apr. 28 2016 (2 pp).
YS Khong, Continental banks on Ethernet Technology for Vehicle Networking, TechnologyforVehicleNetworking, URL: http://autoworld.com.my/news/2011/12/01-/Continental-banks-on-Ethernet-Technology-for-Vehicle-Networking/, Dec. 1, 2011 (3 pp).
Denso Corporation, What is the Development Environment Required for In-Vehicle Software Development-Aiming to Efficient Software Development by Introducing Integrity—Dec. 24, 2012 (15 pp).
ITmedia Inc., The history of the CAN spread which starts with the Benz S class, URL:http://mono ist.atmarkit.co.jp/mn/articles/0805/09-/news152_2.html, 20 May 9, 2008 (5 pp).
Kevin Mahaffey, Tesla Model S Hacking: The discovery obtained there, teachings, URL: https: 2: hacking of//blog. lookout.com/jp/tesla model-s—[1of discovery / which was obtained there /, teachings, 27 Aug. 25, 2015 (9 pp).
Japanese Notice of Reasons for Revocation dated Jul. 16, 2019, issued in corresponding Japanese Patent Application No. 2017-165359.
Japanese Decision on Opposition dated Jan. 9, 2020, issued in corresponding Japanese Patent Application No. 2017-165359.
Office Action dated Apr. 28, 2021, in corresponding Japanese patent Application No. 2018-057312, 10 pages.
International Search Report and Written Opinion dated Sep. 25, 2018 for PCT/JP2018/032016 filed on Aug. 29, 2018, 13 pages including English Translation of the International Search Report.

* cited by examiner

ANTENNA APPARATUS

CROSS-REFERENCE TO RELATED APPLICATIONS

The present application is based on PCT filing PCT/JP2018/032016, filed Aug. 29, 2018, which claims priority to JP 2017-165359, filed Aug. 30, 2017, and JP 2017-165360, filed Aug. 30, 2017, the entire contents of each are incorporated herein by reference.

TECHNICAL FIELD

The present invention relates to an antenna apparatus.

BACKGROUND ART

Conventionally, there has been proposed a vehicle-mounted antenna apparatus including a plurality of antenna elements, as disclosed in Patent Literature 1.

CITATION LIST

Patent Literature

Patent Literature 1: JP 2016-172460 A

SUMMARY OF INVENTION

Technical Problem

However, each of the antenna elements is simply accommodated in a case, and signals sent or received by the antenna elements need to be transmitted to and received from other devices outside the case through separate signal wires, thus resulting in complicated wiring.

Therefore, an object of the present invention is to provide an antenna apparatus capable of simplifying wiring.

Solution to Problem

The antenna apparatus according to the present invention includes a signal processing section having at least two of a first processing unit for calculating position information of a vehicle to which a first antenna element is attached on the basis of information obtained through the first antenna element, a second processing unit for performing mobile communication through a second antenna element, a third processing unit for receiving information from outside of the vehicle and transmitting information that pertains to the vehicle through a third antenna element, a fourth processing unit for receiving at least either of a digital broadcast and a terrestrial broadcast through a fourth antenna element, and a fifth processing unit for performing image processing on an image signal obtained from an imaging unit; an antenna element section having one or more antenna element among the first antenna element to the fourth antenna element, which corresponds to one or more processing unit, included in the signal processing section, among the first processing unit to the fourth processing unit; and a transceiver unit connected to a gateway ECU of the vehicle through an onboard LAN. Among the first antenna element to the fourth antenna element and the imaging unit, one or more antenna element/imaging unit which corresponds to one or more processing unit, included in the signal processing section, among the first processing unit to the fifth processing unit, is covered with a case. Among the first antenna element to the fourth antenna element and the imaging unit, one or more antenna element/imaging unit which corresponds to one or more processing unit, included in the signal processing section, among the first processing unit to the fifth processing unit, is accommodated in a housing arranged at a position closer to the antenna element section than the gateway ECU. Among the first antenna element to the fourth antenna element and the imaging unit, one or more antenna element/imaging unit which corresponds to one or more processing unit, included in the signal processing section, among the first processing unit to the fifth processing unit, communicates with the gateway ECU through the transceiver unit.

The signal processing section disposed near the antenna element section transmits/receives signals received through the antenna element section having a plurality of antenna elements and signals transmitted through the antenna element section to/from the gateway ECU connected through the onboard LAN. This allows the signals that transmit/receive through the plurality of antenna elements to be transferred to other devices using one cable, so that wiring can be simplified.

Preferably, the antenna apparatus includes a voltage/current control unit for supplying electric power supplied from a battery of the vehicle to one or more processing unit, included in the signal processing section, among the first processing unit to the fifth processing unit, in a state where at least either of voltage and current is adjusted using a switching regulator. The voltage/current control unit is disposed outside the case.

The voltage/current control unit adjusts the voltage applied to the units and the current passing through said units, using the switching regulator. This makes it possible to further reduce electric energy loss, compared with a form using a linear regulator.

The voltage/current control unit is disposed outside the case that accommodates at least the antenna elements or the like. This allows noise emitted from an inverter in the switching regulator to have less effect on the antenna element section.

Further preferably, at least the second antenna element is covered with the case. The signal processing section has at least the second processing unit. Power supply to the second processing unit is constantly performed from the battery of the vehicle. Power supply to one or more antenna element/imaging unit covered with the case, among the first antenna element, the third antenna element, the fourth antenna element, and the imaging unit and power supply to one or more processing unit included in the signal processing section, among the first processing unit, the third processing unit, the fourth processing unit, and the fifth processing unit, are performed when an engine, an ignition, or a power switch of the vehicle is in ON state.

Thus, calling from the second processing unit is constantly available, which makes it possible to perform mobile communication such as an emergency call, regardless of the ON/OFF state of the engine or the like of the vehicle.

Furthermore, preferably, at least the first and second antenna elements are covered with the case. The signal processing section has at least the first and second processing units. A reference clock of the first processing unit is adjusted on the basis of information obtained from the first antenna element. The reference clock is used for timing control of the second processing unit. Power supply to the first processing unit and the second processing unit is constantly performed from the battery of the vehicle.

Furthermore, preferably, the signal processing section has at least either of the second processing unit and the third processing unit, and the first processing unit. A reference clock of the first processing unit is adjusted on the basis of information obtained from the first antenna element. The reference clock is used for timing control of one or more processing unit, included in the signal processing section, among the second processing unit and the third processing unit.

The reference clock adjusted by the first processing unit is used for timing control of other devices (second processing unit or the like) that configure the signal processing section.

This allows the reference clock of a plurality of devices to be shared using one antenna element (first antenna element) for obtaining position information. Further, it is possible to configure without disposing an antenna element corresponding to the first antenna element and an apparatus for adjusting the reference clock in each of the devices (e.g., second processing unit and third processing unit).

Furthermore, preferably, the signal processing section has at least the first processing unit and the third processing unit. A reference clock of the first processing unit is adjusted on the basis of information obtained from the first antenna element. The third processing unit sends the position information calculated by the first processing unit and time information based on the reference clock, as the information that pertains to the vehicle.

The position information obtained from the first processing unit is used as position information included in own vehicle information sent by the third processing unit.

The reference clock adjusted by the first processing unit is used as time information included in the own vehicle information sent by the third processing unit.

This allows the position information and reference clock of the plurality of devices to be shared using one antenna element (first antenna element) for obtaining position information. Further, it is possible to configure without disposing an antenna element corresponding to the first antenna element, an apparatus for calculating the position information, and an apparatus for adjusting the reference clock in each of the devices (e.g., third processing unit).

Furthermore, preferably, the transceiver unit is covered with the case.

Furthermore, preferably, the case and the housing are arranged in a positional relationship so as to sandwich a member holding the antenna element section in the vehicle.

Furthermore, preferably, the signal processing section has the first processing unit and the fifth processing unit. The imaging unit is disposed inside the case. The fifth processing unit adds at least one of the position information calculated by the first processing unit and the time information based on a reference clock adjusted by the first processing unit.

This allows the position information or time information to be added to image data produced in an image processing module.

Furthermore, preferably, the position information of the vehicle is used to control other apparatus separate from an information output apparatus for outputting the position information of the vehicle, in the vehicle through the onboard LAN.

Advantageous Effects of Invention

As described above, according to the present invention, an antenna apparatus capable of simplifying wiring can be provided.

DESCRIPTION OF EMBODIMENTS

The present embodiment will be described below using the diagrams.

It should be noted that the embodiment is not limited to the following embodiments. As a rule, the contents described in one embodiment apply to the other embodiments in the same manner. The embodiments and modifications can be appropriately combined.

Figure 1:
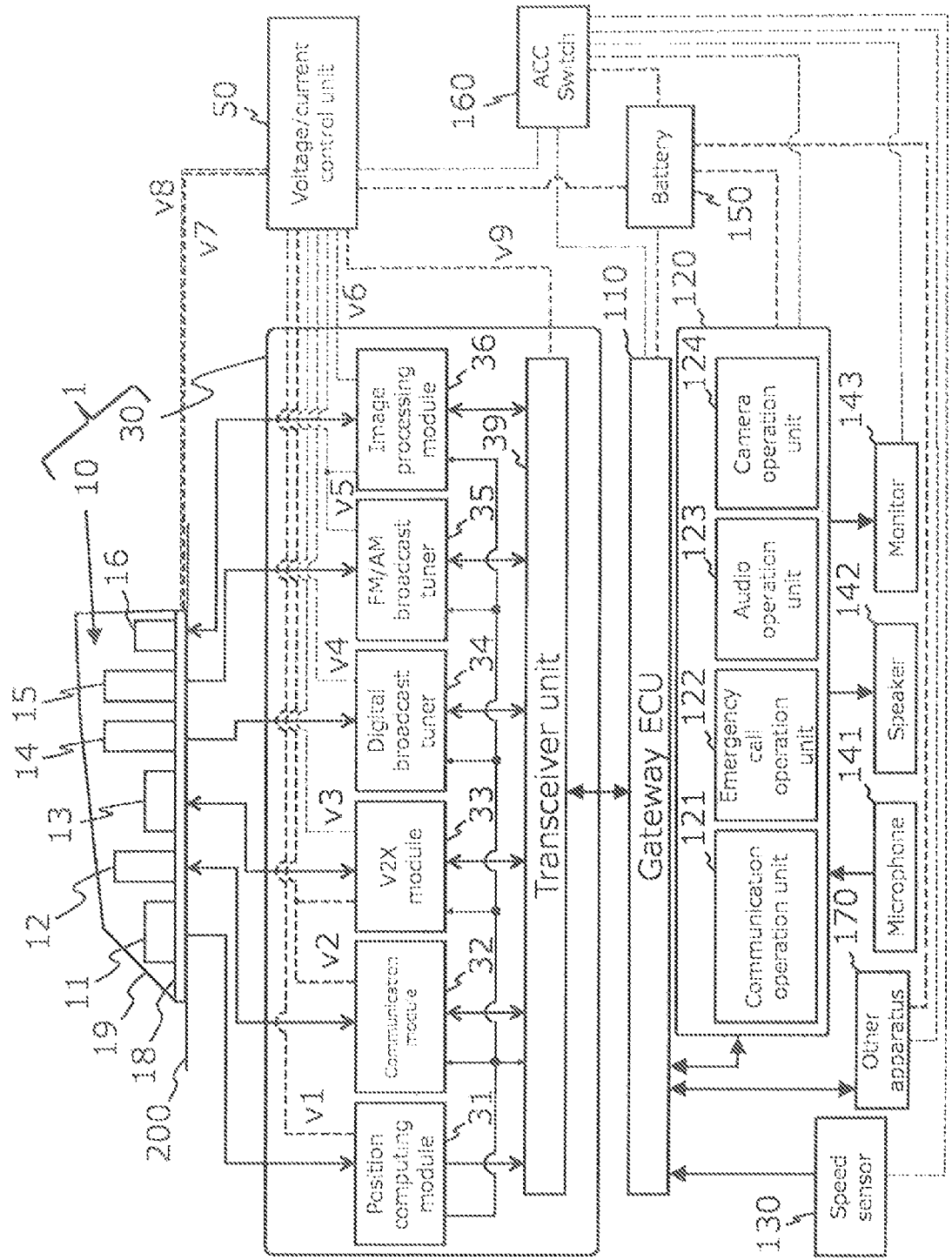
FIG. 1 is a block diagram of a vehicle including an antenna apparatus which shares use of a GNSS antenna, according to the present embodiment.

An antenna apparatus 1 according to the present embodiment includes an antenna element section 10, a signal processing section 30, and a voltage/current control unit 50, as shown in FIG. 1.

A vehicle to which the antenna apparatus 1 according to the present embodiment is attached includes a gateway Electronic Control Unit (ECU) 110, an information output apparatus 120, a speed sensor 130, a microphone 141, a speaker 142, a monitor 143, a battery 150, and an ACC switch 160.

The antenna element section 10 has a first antenna element 11, a separate antenna element from the first antenna element 11, and an imaging unit 16. The separate antenna element from the first antenna element 11 has a second antenna element 12, a third antenna element 13, a fourth antenna element 14, and a fifth antenna element 15.

The signal processing section 30 has a first processing unit (position computing module) 31, a separate processing unit from the first processing unit 31, and a transceiver unit (Ethernet (registered trademark) module) 39. The separate processing unit from the first processing unit 31 has a second processing unit (communication module) 32, a third processing unit (V2X module) 33, a fourth processing unit (digital broadcast tuner) 34, a fifth processing unit (FM/AM broadcast tuner) 35, and a sixth processing unit (image processing module) 36.

The first processing unit (position computing module) 31, the second processing unit (communication module) 32, the third processing unit (V2X module) 33, the fourth processing unit (digital broadcast tuner) 34, the fifth processing unit (FM/AM broadcast tuner) 35, and the sixth processing unit (image processing module) 36 are realized by, for example, a processor.

The processor herein refers to, for example, Central Processing Unit (CPU), Graphics Processing Unit (GPU), Application Specific Integrated Circuit (ASIC), Programmable Logic Device (PLD), and Field Programmable Gate Array (FPGA).

The first antenna element 11 to the third antenna element 13 according to the present embodiment correspond to the first antenna element to the third antenna element in the claims.

The fourth antenna element 14 and the fifth antenna element 15 according to the present embodiment correspond to the fourth antenna element in the claims.

The first processing unit 31 to the third processing unit 33 according to the present embodiment correspond to the first processing unit to the third processing unit in the claims.

The fourth processing unit 34 and the fifth processing unit 35 according to the present embodiment correspond to the fourth processing unit in the claims.

The sixth processing unit 36 according to the present embodiment corresponds to the fifth processing unit in the claims.

The antenna element section 10 will be described in detail.

The antenna element section 10 is attached onto a substrate 18 having an amplifier circuit or the like of the antenna element mounted thereon. The antenna element section 10 is accommodated inside an antenna case 19 placed on a roof 200 of the vehicle. In other words, the antenna element section 10 is covered with the antenna case 19 from above.

The antenna case 19 is constituted separately from the roof 200 of the vehicle. The antenna case 19 and a base (not shown) holding the substrate 18 are attached onto the roof 200 in a state that the antenna case 19 and the base holding the substrate 18 sandwich the antenna element section 10.

The antenna case 19 may, however, be formed in a shape in which the roof 200 of the vehicle is partially protruded.

In this case, the antenna element section 10 is attached to an inner panel (not shown) which is disposed on the inner side with respect to the roof 200 of the vehicle, through the base or the substrate 18. The protruded region (antenna case 19) of the roof 200 is formed so as to cover the antenna element section 10 from above.

The first antenna element 11 is an antenna element for Global Navigation Satellite System (GNSS). The first antenna element 11 is used to receive, from a Global Positioning System (GPS) satellite or the like, the position information and the time information of said satellite.

The first antenna element 11 is formed of, for example, a patch antenna.

The second antenna element 12 is an antenna element for mobile communication using telephone lines. The second antenna element 12 is used to transmit/receive information to/from a mobile phone base station.

The second antenna element 12 is formed of, for example, a plate-shaped antenna element.

The third antenna element 13 is an antenna element for vehicle-to-vehicle communication, road-to-vehicle communication, and vehicle-to-mobile terminal communication (V2X communication) on the basis of the IEEE802.11p standard. The third antenna element 13 is used to transmit/receive information to/from other vehicles positioned at a short distance (vehicles separate from the vehicle to which the first antenna element 11 is attached), roadside machines, and mobile terminals.

The third antenna element 13 is formed of, for example, a dipole antenna.

The fourth antenna element 14 is an antenna element for receiving a digital broadcast such as XM or Digital Audio Broadcast (DAB).

The fourth antenna element 14 is formed of, for example, a patch antenna.

The fifth antenna element 15 is an antenna element for receiving a terrestrial broadcast such as an FM broadcast or an AM broadcast.

The fifth antenna element 15 is formed of, for example, a capacity loaded element and a coil.

The imaging unit 16 is a camera for shooting the rear of the vehicle or the like. Note that the example of FIG. 1 shows the case where the imaging unit 16 is arranged in the antenna element section 10, but the position where the imaging unit 16 is arranged is not limited to the antenna element section 10. For example, the imaging unit 16 may be arranged in any attachable position in the vehicle. The imaging unit 16 may shoot the front or side of the vehicle.

An amplifier is mounted on the lower surface of the substrate 18 (an opposite surface to the first antenna element 11 and the like). The amplifier amplifies signals obtained from the first antenna element 11, the fourth antenna element 14, and the fifth antenna element 15.

Said amplifier may be mounted on the upper surface of the substrate 18 or on both the upper surface and the lower surface.

Next, the signal processing section 30 will be described in detail.

The signal processing section 30 is an apparatus for transmitting/receiving a signal received by the antenna element section 10 and a signal transmitted by the antenna element section 10, to/from the gateway ECU 110 connected through an onboard Local Area Network (LAN) by a digital signal. The first processing unit 31 to the sixth processing unit 36 and transceiver unit 39 constituting the signal processing section 30 are accommodated in a single housing which is disposed separately from the antenna case 19.

Said housing is arranged at least at a position closer to the antenna element section 10 than the gateway ECU 110.

For example, said housing is considered to be arranged immediately below a region where the antenna element section 10 is arranged in a member holding the antenna element section 10 in the vehicle, and be arranged in a positional relationship such that the antenna element section 10 and the signal processing section 30 vertically sandwich the member holding the antenna element section 10 in said vehicle. The member holding the antenna element section 10 in the vehicle is the roof 200 or an inner panel.

The housing may, however, be configured at a first distance d1 (e.g., d1=10 cm) or more away from the antenna element section 10 so that the signal processing section 30 is arranged in another region in the vehicle room.

Alternatively, the signal processing section 30 may be disposed between the substrate 18 and the antenna case 19, on the top of the roof 200, that is, the antenna element section 10 and the signal processing section 30 may be covered with the antenna case 19.

In this case, the antenna case 19 serves as the housing.

The first processing unit (position computing module) 31 is connected with the first antenna element 11 without involving the gateway ECU 110. The first processing unit 31 is arranged on the signal path between the first antenna element 11 and the transceiver unit 39. The first processing unit 31 receives the position information and the time information of the satellite through the first antenna element 11. The first processing unit 31 calculates the position information (latitude/longitude information) of the vehicle on the basis of the position information and the time information of the satellite, and adjusts the reference clock of the first processing unit 31.

The signal including the position information and the time information of the satellite is received through the first antenna element 11, and is then subjected to demodulation, conversion into the position information of the vehicle, and A/D conversion in the first processing unit 31.

The position information of said vehicle is subjected to A/D conversion in the first processing unit 31, and then transmitted to the gateway ECU 110 through the transceiver unit 39. The position information of said vehicle is used in the information output apparatus 120 such as a car navigation system.

The first processing unit 31 transmits the position information of said vehicle and the information on the reference clock to the second processing unit 32 to the sixth processing unit 36 and the transceiver unit 39.

The reference clock adjusted by the first processing unit 31 is used for timing control of the units of the signal processing section 30. The units of the signal processing section 30 herein include at least the first processing unit 31 to the sixth processing unit 36, and the transceiver unit 39.

The present embodiment has described that the signal including the position information and the time information of the satellite is subjected to demodulation or the like in the first processing unit 31 and is then transmitted from the first processing unit 31 to the second processing unit 32 to the sixth processing unit 36.

Figure 4:
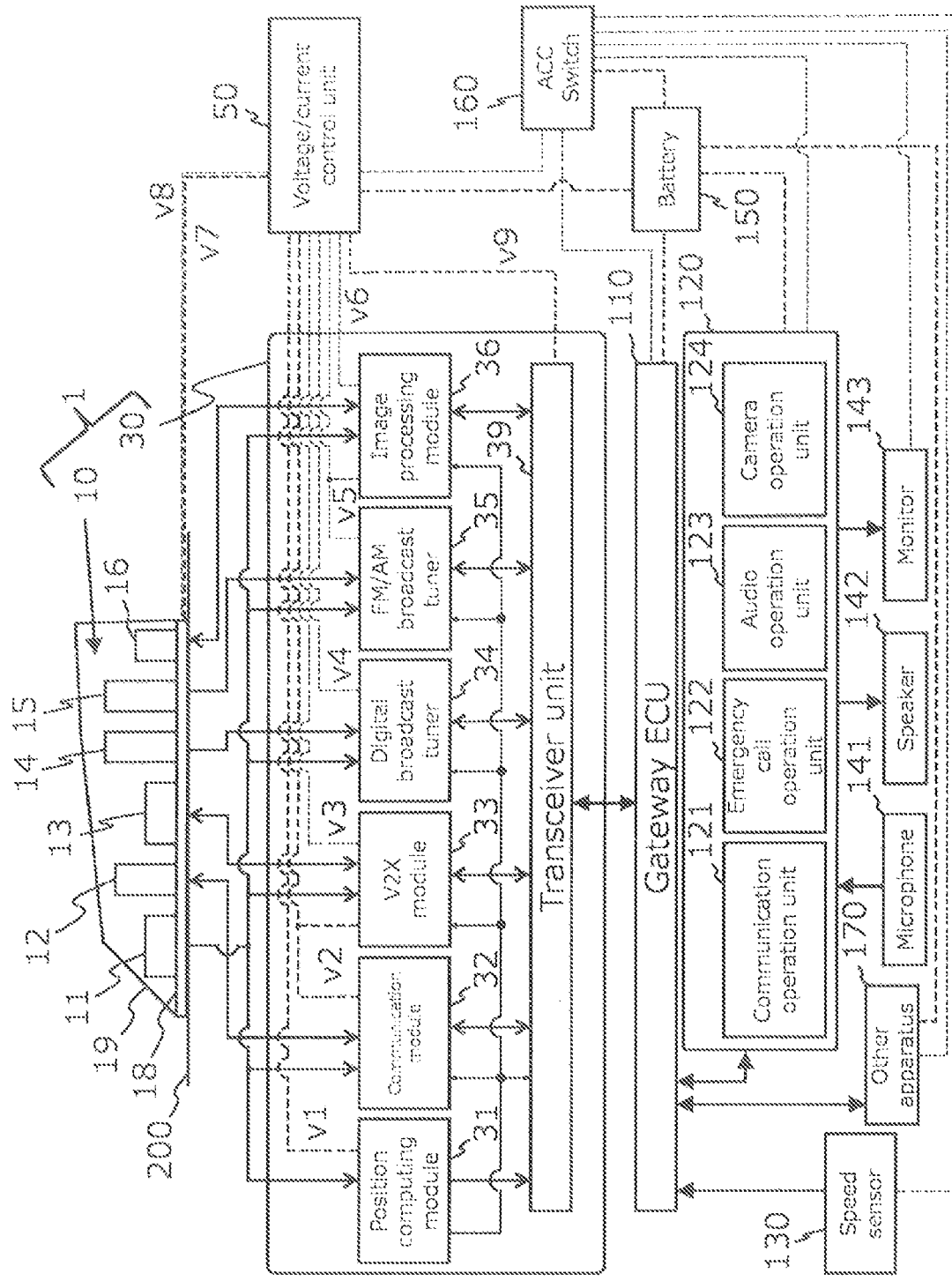
FIG. 4 is a block diagram of a vehicle including an antenna apparatus in which the first antenna element is connected to the second processing unit to the sixth processing unit without involving the first processing unit, in addition to FIG. 1.

However, the signal including the position information and the time information of the satellite, received by the first antenna element 11, may be subjected to demodulation, conversion into the position information of the vehicle, and A/D conversion in the second processing unit 32 to the sixth processing unit 36. In this case, the first antenna element 11 is connected to the second processing unit 32 to the sixth processing unit 36 without involving the first processing unit 31, as shown in FIG. 4.

The signal including the position information and the time information of the satellite, received by the first antenna element 11, may also be subjected to demodulation, conversion into the position information of the vehicle, and A/D conversion, in one of the second processing unit 32 to the sixth processing unit 36 (e.g., the second processing unit 32), and the signal after the A/D conversion may be then transmitted to the rest of the second processing unit 32 to the sixth processing unit 36 (e.g., the third processing unit 33 to the sixth processing unit 36). In this case, the first antenna element 11 is connected to one of the second processing unit 32 to the sixth processing unit 36 without involving the first processing unit 31.

The information on the reference clock may be transmitted to the units of the vehicle through the transceiver unit 39 and the gateway ECU 110, to thereby be used for timing control thereof.

The transmission of the position information and the information on the reference clock from the first processing unit 31 to the second processing unit 32 to the sixth processing unit 36 may be performed without involving the transceiver unit 39 or through the transceiver unit 39.

The second processing unit 32 and the third processing unit 33 may not, however, receive the position information and the information on the reference clock from the first processing unit 31. In this case, the second processing unit 32 and the third processing unit 33 each calculate the position information and adjust their own reference clocks.

Figure 2:
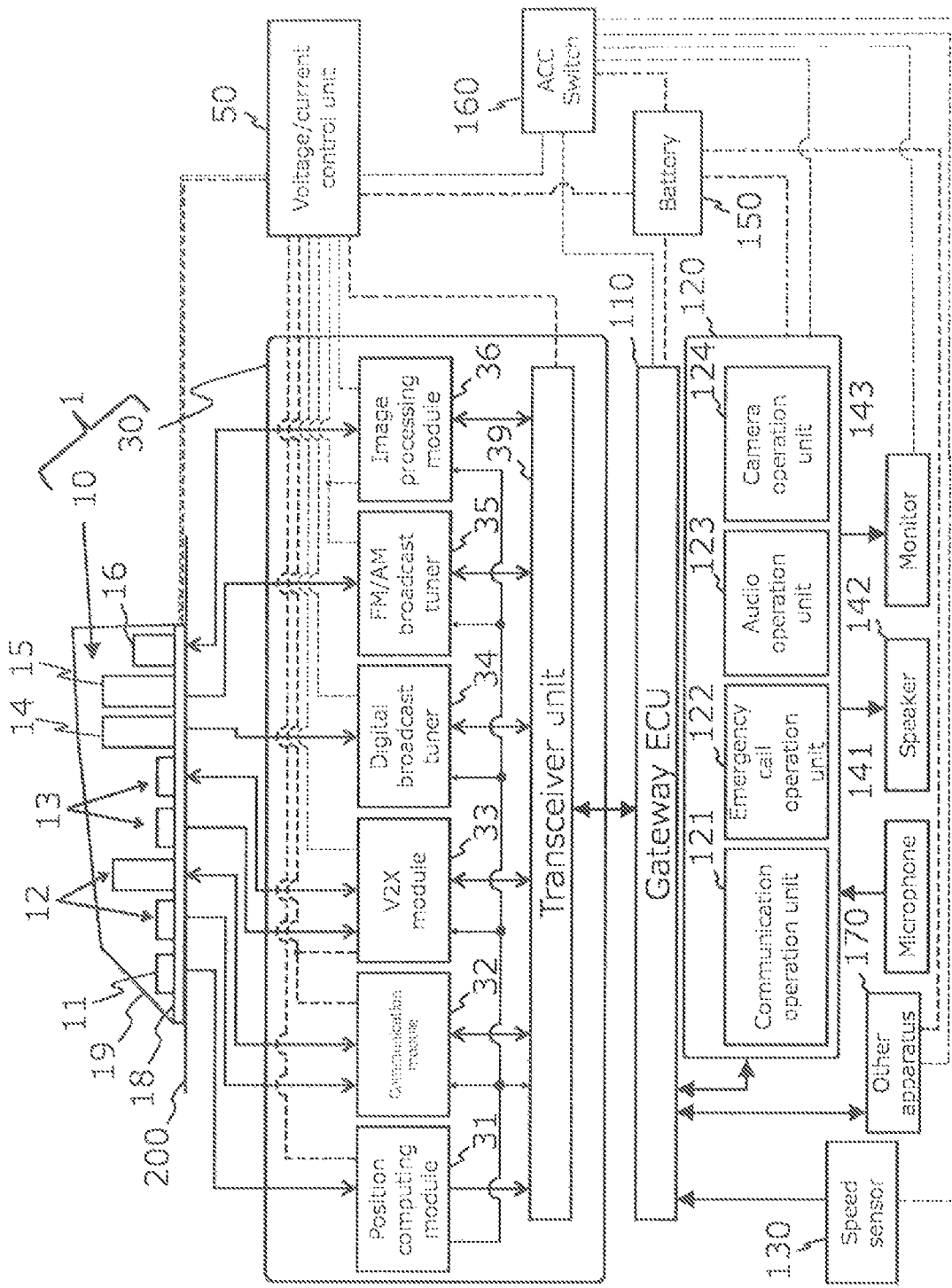
FIG. 2 is a block diagram of a vehicle including an antenna apparatus in which the GNSS antennas are separately disposed, according to the present embodiment.

In order to calculate the position information and adjust its own reference clock in the second processing unit 32, the second antenna element 12 has an antenna element for mobile communication using telephone lines and a GNSS antenna element, as shown in FIG. 2. In order to calculate the position information and adjust its own reference clock in the third processing unit 33, the third antenna element 13 has an antenna element for vehicle-to-vehicle communication and the like and a GNSS antenna element.

The second processing unit (communication module) 32 is connected with the second antenna element 12 without involving the gateway ECU 110. The second processing unit 32 is arranged on the signal path between the second antenna element 12 and the transceiver unit 39. The second processing unit 32 performs mobile communication using telephone lines such as calling, on the basis of the communication standard such as Long Term Evolution (LTE).

A control signal from a communication operation unit 121 or an emergency call operation unit 122 is transmitted to the second processing unit 32 through the gateway ECU 110 and the transceiver unit 39. The second processing unit 32 operates on the basis of said control signal.

An audio signal from the microphone 141 is transmitted to the second processing unit 32 through the gateway ECU 110 and the transceiver unit 39. The audio signal from the microphone 141 is subjected to D/A conversion and modulation in the second processing unit 32. The signal thus subjected to D/A conversion and modulation is sent to a terminal in a state of communicating with the second processing unit 32 through the second antenna element 12.

The audio signal, image signal, and data from the terminal in a state of communicating with the second processing unit 32 are received through the second antenna element 12. The audio signal, image signal, and data from said terminal are subjected to demodulation and A/D conversion in the second processing unit 32. The signal thus subjected to demodulation and A/D conversion in the second processing unit 32 is transmitted to the information output apparatus 120 through the transceiver unit 39 and the gateway ECU 110. Thereafter, the audio signal is output from the speaker 142, and the data and the image signal are output from the monitor 143.

In the case where a call is made on the basis of the control from the emergency call operation unit 122, the data including the position information obtained from the first processing unit 31 is subjected to modulation in the second processing unit 32. The signal thus subjected to modulation in the second processing unit 32 is sent to the terminal (predetermined emergency call control center) in a state of communicating with the second processing unit 32 through the second antenna element 12.

Note that, in the case where the emergency call operation unit 122 is operated by a user or the like, a call to the predetermined emergency call control center may be made. The call to the predetermined emergency call control center may, however, be made automatically. Specifically, in the case where an airbag (not shown) of the vehicle is activated, the information on the activation of said airbag is transmitted to the second processing unit 32 through the gateway ECU 110 and the transceiver unit 39. When the second processing unit 32 receives the information on the activation of said airbag, said call is made.

The third processing unit (V2X module) 33 is connected with the third antenna element 13 without involving the gateway ECU 110. The third processing unit 33 is arranged on the signal path between the third antenna element 13 and the transceiver unit 39. The third processing unit 33 performs modulation processing and demodulation processing for signal transmission and reception through the third antenna element 13.

Own vehicle information (information that pertains to the vehicle) including position information, speed information, and time information is subjected to modulation in the third processing unit 33. The signal thus subjected to modulation in the third processing unit 33 is sent through the third antenna element 13.

Of the own vehicle information, the position information is used the position information obtained from the first processing unit 31.

Of the own vehicle information, the speed information is used the information that is output from the speed sensor 130 and is then transmitted through the gateway ECU 110 and the transceiver unit 39. The speed information is subjected to D/A conversion and then to modulation in the third processing unit 33.

Of the own vehicle information, the time information is calculated on the basis of the reference clock obtained by the first processing unit 31.

The information from outside of the vehicle is received through the third antenna element 13, and is then subjected to demodulation and A/D conversion in the third processing unit 33. The signal thus subjected to demodulation and A/D conversion in the third processing unit 33 is transmitted to the information output apparatus 120 through the transceiver unit 39 and the gateway ECU 110. Thereafter, the audio signal is output from the speaker 142, and the data and the image signal are output from the monitor 143. The information from outside of the vehicle includes information on other vehicles including position information, speed information, and time information, information from roadside machines, and information from mobile terminals.

The signal thus subjected to demodulation and A/D conversion in the third processing unit 33 may be transmitted to another apparatus 170 through the transceiver unit 39 and the gateway ECU 110. The other apparatus 170 will be described later in detail.

The fourth processing unit (digital broadcast tuner) 34 is connected with the fourth antenna element 14 without involving the gateway ECU 110. The fourth processing unit 34 is arranged on the signal path between the fourth antenna element 14 and the transceiver unit 39. The fourth processing unit 34 performs tuning and demodulation processing for signal reception through the fourth antenna element 14.

A control signal from an audio operation unit 123, related to digital broadcasting, is transmitted to the fourth processing unit 34 through the gateway ECU 110 and the transceiver unit 39. The fourth processing unit 34 operates on the basis of said control signal.

Radio waves for digital broadcasting, corresponding to the frequencies set in the audio operation unit 123, are received through the fourth antenna element 14 and are then subjected to tuning, demodulation, and A/D conversion in the fourth processing unit 34. The signals thus subjected to tuning, demodulation, and A/D conversion in the fourth processing unit 34 are transmitted to the information output apparatus 120 through the transceiver unit 39 and the gateway ECU 110. Thereafter, the audio signal is output from the speaker 142, and the data and the image signal are output from the monitor 143.

The fifth processing unit (FM/AM broadcast tuner) 35 is connected with the fifth antenna element 15 without involving the gateway ECU 110. The fifth processing unit 35 is arranged on the signal path between the fifth antenna element 15 and the transceiver unit 39. The fifth processing unit 35 performs tuning and demodulation processing for signal reception through the fifth antenna element 15.

A control signal from the audio operation unit 123, related to FM/AM broadcasting, is transmitted to the fifth processing unit 35 through the gateway ECU 110 and the transceiver unit 39. The fifth processing unit 35 operates on the basis of said control signal.

Radio waves for FM broadcasting and AM broadcasting, corresponding to the frequencies set in the audio operation unit 123, are received through the fifth antenna element 15, and are then subjected to tuning, demodulation, and A/D conversion in the fifth processing unit 35. The signals thus subjected to tuning, demodulation, and A/D conversion in the fifth processing unit 35 are transmitted to the information output apparatus 120 through the transceiver unit 39 and the gateway ECU 110. Thereafter, the audio signal is output from the speaker 142, and the data and the image signal are output from the monitor 143.

The sixth processing unit (image processing module) 36 is connected with the imaging unit 16 without involving the gateway ECU 110. The sixth processing unit 36 is arranged on the signal path between the imaging unit 16 and the transceiver unit 39. The sixth processing unit 36 performs image processing which converts an image signal obtained by imaging operation in the imaging unit 16 into image data which can be output from the monitor 143 or the like.

A control signal from a camera operation unit 124 is transmitted to the sixth processing unit 36 through the gateway ECU 110 and the transceiver unit 39. The imaging unit 16 and the sixth processing unit 36 operate on the basis of said control signal.

An image signal obtained by the imaging operation in the imaging unit 16 is subjected to image processing, addition of position information and time information, and protocol conversion in the sixth processing unit 36. The signal thus subjected to image processing, addition of position information and time information, and protocol conversion in the sixth processing unit 36 is transmitted to the information output apparatus 120 through the transceiver unit 39 and the gateway ECU 110, and is then output from the monitor 143.

As the position information to be added to the image signal, the position information obtained from the first processing unit 31 is used.

The time information to be added to the image information is calculated on the basis of the reference clock obtained by the first processing unit 31.

The imaging operation in the imaging unit 16 is subjected to on-off control on the basis of the control signal from the camera operation unit 124. The imaging operation in the imaging unit 16 may be performed constantly or only while a shift lever of the vehicle is set in the rear mode.

The transceiver unit (Ethernet (registered trademark) module) 39 communicates with the gateway ECU 110 through the onboard LAN such as a Controller Area Network (CAN).

The transceiver unit 39 is connected with the gateway ECU 110 through a LAN cable.

The transceiver unit 39 is arranged on the signal paths between the processing units (the first processing unit 31 to the sixth processing unit 36) and the gateway ECU 110.

The voltage/current control unit 50 includes a switching regulator. The voltage/current control unit 50 is configured to convert electric power directly supplied from the battery 150 and electric power supplied through the ACC switch 160 into voltage and current corresponding to the specifications of the units of the antenna element section 10 and the signal processing section 30. The switching regulator included in the voltage/current control unit 50 is used for this conversion of voltage and current.

For example, a voltage of DC 12V is converted into a voltage of DC 5V, 3.3V, 1.8V, or the like by the voltage/current control unit 50.

The present embodiment shows examples that the voltages as shown below are applied to the units of the antenna element section 10 and the signal processing section 30. Specifically, a first voltage v1 is constantly applied to the first processing unit 31. A second voltage v2 is constantly applied to the second processing unit 32 and the third processing unit 33. A third voltage v3 is applied to the third processing unit 33 when the ACC switch 160 is in ON state. A fourth voltage v4 is applied to the fourth processing unit 34 when the ACC switch 160 is in ON state. A fifth voltage v5 is applied to the fifth processing unit 35 and the sixth processing unit 36 when the ACC switch 160 is in ON state. A sixth voltage v6 is applied to the sixth processing unit 36 when the ACC switch 160 is in ON state. A seventh voltage v7 is constantly applied to the substrate 18. An eighth voltage v8 is applied to the substrate 18 when the ACC switch 160 is in ON state. A ninth voltage v9 is constantly applied to the transceiver unit 39.

The voltage/current control unit 50 is disposed outside the antenna case 19 that accommodates the antenna element section 10 and the housing that accommodates the signal processing section 30. The voltage/current control unit 50 is connected with the antenna element section 10 and the signal processing section 30 through cables.

However, in the case where the signal processing section 30 is arranged at the first distance d1 or more away from the antenna element section 10, the voltage/current control unit 50 may be accommodated in the housing of the signal processing section 30.

The gateway ECU 110 transmits/receives a signal to/from an electronic device placed in the interior of the vehicle through the onboard LAN.

The information output apparatus 120 is an apparatus for outputting information by sound and/or video, such as a car navigation system and an audio device. The information output apparatus 120 has the communication operation unit 121, the emergency call operation unit 122, the audio operation unit 123, and the camera operation unit 124. The communication operation unit 121 and the emergency call operation unit 122 are used to operate the second processing unit 32. The audio operation unit 123 is used to operate the fourth processing unit 34 and the fifth processing unit 35. The camera operation unit 124 is used to operate the imaging unit 16 and the sixth processing unit 36.

The communication operation unit 121, the emergency call operation unit 122, the audio operation unit 123, and the camera operation unit 124 may be constituted of independent buttons or by a touch panel provided on the monitor 143.

The speed sensor 130 is configured to output information on the vehicle speed as a pulse signal or the like to the gateway ECU 110.

The speed sensor 130 may be incorporated in the signal processing section 30 (particularly, the third processing unit 33).

The microphone 141 is configured to output an audio signal to the information output apparatus 120.

The speaker 142 is configured to output the audio signal from the information output apparatus 120.

The monitor 143 is configured to output a video signal from the information output apparatus 120.

The battery 150 is configured to supply electric power to the electronic device placed in the vehicle.

The ACC switch 160 is a switch to be turned to ON state when the engine, ignition, or power switch of the vehicle is in ON state.

Without involving the ACC switch 160, electric power from the battery 150 is directly supplied to a member requiring power supply regardless of the ON/OFF state of the engine, ignition, or power switch of the vehicle. The member requiring power supply regardless of the ON/OFF state of the engine or the like of the vehicle is, for example, a member having a clock function.

Through the ACC switch 160, electric power from the battery 150 is supplied to a member requiring power supply only when the engine, ignition, or power switch of the vehicle is in ON state.

Without involving the ACC switch 160, electric power from the battery 150 is directly supplied to the transceiver unit 39 and the first processing unit 31 to the third processing unit 33, and a region related to the first antenna element 11 to the third antenna element 13 on the substrate 18.

In this case, a call from the second processing unit 32 is constantly available. This makes it possible to perform mobile communication such as an emergency call, regardless of the ON/OFF state of the engine or the like of the vehicle.

A signal transmission/reception through the third processing unit 33 is also constantly available. This makes it possible to perform V2X communication regardless of the ON/OFF state of the engine or the like of the vehicle.

For example, it is contemplated that the following operation may be carried out even when the engine, ignition, or power switch of the vehicle is in OFF state. Said following operation includes position information acquisition by the first antenna element 11 and the first processing unit 31, mobile communication (communication with the base station) by the second antenna element 12 and the second processing unit 32, and V2X communication by the third antenna element 13 and the third processing unit 33.

In order to reduce the amount of power consumption, it is desired to reduce the operation frequency (frequency of position information acquisition, communication frequency with the base station, V2X communication frequency) as compared with the time when the engine, ignition, or power switch of the vehicle is in ON state.

Through the ACC switch 160, electric power from the battery 150 is supplied to the fourth processing unit 34 to the sixth processing unit 36, and a region related to the fourth antenna element 14, the fifth antenna element 15, and the imaging unit 16 on the substrate 18.

In the case of the following form, however, power supply to the first processing unit 31 and to the region related to the first antenna element 11 on the substrate 18 may be performed through the ACC switch 160. Said following form is one in which each of the second processing unit 32 and the third processing unit 33 calculates position information and adjusts their own reference clocks without receiving the position information and information on the reference clock from the first processing unit 31 (see FIG. 2).

Furthermore, in the case where the V2X communication is not performed with the engine or the like of the vehicle being in OFF state, power supply to the third processing unit 33 and to the region related to the third antenna element 13 on the substrate 18 may be performed through the ACC switch 160.

The voltage/current control unit 50 may be provided separately with a cable extending to the substrate 18 of the antenna element section 10 and cables extending to the units of the signal processing section 30. Further, the voltage/ current control unit 50 may have a part of the cable extending to the substrate 18 of the antenna element section 10, extended to the units of the signal processing section 30 byway of the antenna element section 10. Or, the voltage/current control unit 50 may have a part of the cables extending to the signal processing section 30, extended to the substrate 18 of the antenna element section 10 byway of the signal processing section 30.

In the present embodiment, the signal processing section disposed near the antenna element section 10 transmits/receives signals received through the antenna element section 10 having the plurality of antenna elements (the first antenna element 11 to the fifth antenna element 15) and signals transmitted through the antenna element section 10, to/from the gateway ECU 110 connected through the onboard LAN, in digital form. This allows the signals that transmit/receive through the plurality of antenna elements to be transferred to other devices using one cable. That is, as compared with the form in which the signals sent or received by the antenna elements are transmitted to and received from other devices outside the case through separate signal wires, thus resulting in complicated wiring, the wiring can be simplified.

The position information obtained from the first processing unit (position computing module) 31 is not only used in the information output apparatus 120 but used as position information included in own vehicle information sent by the third processing unit (V2X module) 33.

The reference clock adjusted by the first processing unit 31 is used for timing control of other devices (second processing unit 32 or the like) that configure the signal processing section 30. Further, the reference clock adjusted by the first processing unit 31 is used as time information included in the own vehicle information sent by the third processing unit 33.

Thus, it is possible to share the position information or reference clock of a plurality of devices using one antenna element (first antenna element 11) for obtaining position information. It is then possible to configure without disposing an antenna element corresponding to the first antenna element 11, an apparatus for calculating the position information, and an apparatus for adjusting the reference clock in each of the devices. The term "each of the devices" herein refers to, for example, the second processing unit 32 and the third processing unit 33.

Further, it is possible to add position information or time information to the image data produced in the sixth processing unit (image processing module) 36.

It is necessary to supply electric power including the voltage and current values which correspond to the specifications, to the members constituting the signal processing section 30. In the state where electric energy loss is minimized and the transceiver performance of the antenna elements in the antenna element section 10 is not affected, then, the electric power supplied from the battery 150 needs to be subjected to voltage/current control.

The voltage/current control unit 50 adjusts the voltage applied to the units of the antenna element section 10 and the signal processing section 30 and the current passing through said units, using the switching regulator. This makes it possible to further reduce electric energy loss, compared with a form using a linear regulator.

The voltage/current control unit 50 is disposed outside the antenna case 19 that accommodates at least the antenna element section 10 and is connected through a cable. This allows noise emitted from an inverter in the switching regulator to have less effect on the antenna element section 10.

Figure 3:
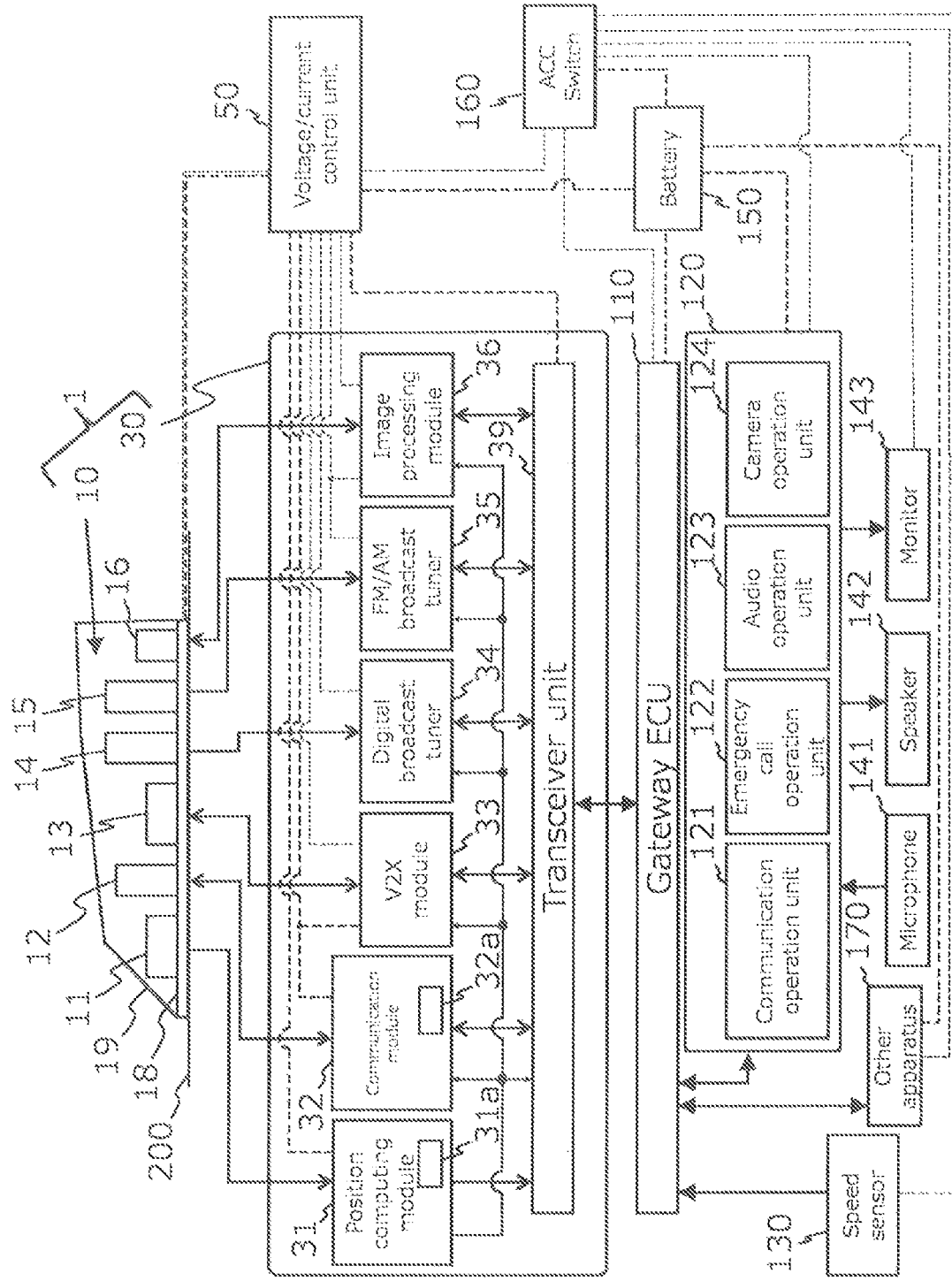
FIG. 3 is a block diagram of a vehicle including an antenna apparatus in which a recording member is incorporated in the first processing unit and a power storage member is incorporated in the second processing unit, in addition to FIG. 1.

As shown in FIG. 3, it is contemplated that a recording member 31*a* may be incorporated in the first processing unit 31 or the second processing unit 32. The recording member 31*a* is configured to record the position information specified by the first processing unit 31 for a certain period (approximately 10 seconds or so). Further, it is contemplated that a power storage member 32*a* may be incorporated in the second processing unit 32 (see FIG. 3). The power storage member 32*a* is constituted of a battery, a capacitor, and the like, and is used to operate mobile communication.

In this case, even when power supply from the battery 150 of the vehicle is not sufficient, the position information recorded on the recording member 31*a* and electric power supplied from the power storage member 32*a* are used to allow the second processing unit 32 to make an emergency call (to call to the predetermined emergency call control center).

The use of the position information of the vehicle and the information on the reference clock, which are obtained from the first antenna element 11 and the first processing unit 31 is not limited to the apparatus (information output apparatus 120) for outputting the position information such as a car navigation system. For example, the position information and the information on the reference clock may be used for control of the other apparatus 170 connected through the onboard LAN.

The other apparatus 170 controls as follows on the basis of the position information of the vehicle. For example, when the other apparatus 170 detects that the vehicle is running on an uphill road, it increases the rotational speed of the engine (other apparatus 170) so as to prevent the vehicle from excessively slowing down, and when it detects that the vehicle is running on a downhill road, it decreases the rotational speed of the engine (other apparatus 170) so as to prevent the vehicle from excessively speeding up. Furthermore, the other apparatus 170 calculates the time of sunrise and sunset on the basis of the position information of the vehicle and the time information based on the reference clock, and then controls headlights or small lights (other apparatus 170) to light up.

The form in which the signal processing section 30 and the gateway ECU 110 are connected therebetween through the onboard LAN has been described. However, the signal processing section 30 and the gateway ECU 110 may be connected therebetween without involving the onboard LAN but through a usual electrical signal cable.

Even in this case, it is also possible to obtain an advantage when the voltage/current control unit 50 is disposed outside the antenna case 19. Further, it is possible to obtain an advantage when the reference clock of the first processing unit 31 is used for timing control of the other processing units or the like.

While the present invention has been described with reference to the embodiments, these embodiments are offered by way of example, and are not intended to limit the scope of the invention. These embodiments can be put into practice in other various forms, and various omissions, replacements, and modifications can be made to the embodiment as long as there is no departure from the idea of the invention. The embodiment or the modification thereof is included in the scope or the idea of the invention, and is included in the scopes of the claims of the invention and the equivalents thereof.

REFERENCE SIGNS LIST

1 Antenna apparatus
10 Antenna element section
11 to 15 First antenna element to fifth antenna element
16 Imaging unit
18 Substrate
19 Antenna case
30 Signal processing section
31 First processing unit (position computing module)
31a Recording member
32 Second processing unit (communication module)
32a Power storage member
33 Third processing unit (V2X module)
34 Fourth processing unit (digital broadcast tuner)
35 Fifth processing unit (FM/AM broadcast tuner)
36 Sixth processing unit (image processing module)
39 Transceiver unit (Ethernet (registered trademark) module)
50 Voltage/current control unit
110 Gateway ECU
120 Information output apparatus
121 Communication operation unit
122 Emergency call operation unit
123 Audio operation unit
124 Camera operation unit
130 Speed sensor
141 Microphone
142 Speaker
143 Monitor
150 Battery
160 ACC switch
170 Other apparatus (engine, head lump, small lump, etc.)
200 Loof
v1 to v9 First voltage to ninth voltage

The invention claimed is:

1. An antenna apparatus comprising:
a signal processing section having at least two of a first processing unit for calculating position information of a vehicle to which a first antenna element is attached on the basis of information obtained through the first antenna element, a second processing unit for performing mobile communication through a second antenna element, a third processing unit for receiving information from outside of the vehicle and transmitting information that pertains to the vehicle through a third antenna element, a fourth processing unit for receiving at least either of a digital broadcast and a terrestrial broadcast through a fourth antenna element, and a fifth processing unit for performing image processing on an image signal obtained from an imaging unit;
an antenna element section having one or more antenna element among the first antenna element to the fourth antenna element, which corresponds to one or more processing unit, included in the signal processing section, among the first processing unit to the fourth processing unit; and
a transceiver unit connected to a gateway ECU of the vehicle through an onboard LAN, wherein
among the first antenna element to the fourth antenna element and the imaging unit, one or more antenna element/imaging unit which corresponds to one or more processing unit, included in the signal processing section, among the first processing unit to the fifth processing unit, is covered with a case,
one or more processing unit, included in the signal processing section, among the first processing unit to the fifth processing unit, is accommodated in a housing arranged at a position closer to the antenna element section than the gateway ECU, and
one or more processing unit, included in the signal processing section, among the first processing unit to the fifth processing unit, communicates with the gateway ECU through the transceiver unit.

2. The antenna apparatus according to claim 1, comprising
a voltage/current control unit for supplying electric power supplied from a battery of the vehicle to one or more processing unit, included in the signal processing section, among the first processing unit to the fifth processing unit, in a state where at least either of voltage and current is adjusted using a switching regulator,
the voltage/current control unit being disposed outside the case.

3. The antenna apparatus according to claim 2, wherein
at least the second antenna element is covered with the case,
the signal processing section has at least the second processing unit,
power supply to the second processing unit is constantly performed from the battery of the vehicle, and
power supply to one or more antenna element/imaging unit covered with the case, among the first antenna element, the third antenna element, the fourth antenna element, and the imaging unit, and power supply to one or more processing unit included in the signal processing section, among the first processing unit, the third processing unit, the fourth processing unit, and the fifth processing unit, are performed when an engine, an ignition, or a power switch of the vehicle is in ON state.

4. The antenna apparatus according to claim 2, wherein
at least the first and second antenna elements are covered with the case,
the signal processing section has at least the first and second processing units,
a reference clock of the first processing unit is adjusted on the basis of information obtained from the first antenna element,
the reference clock is used for timing control of the second processing unit, and
power supply to the first processing unit and the second processing unit is constantly performed from the battery of the vehicle.

5. The antenna apparatus according to claim 1, wherein
the signal processing section has at least either of the second processing unit and the third processing unit, and the first processing unit,
a reference clock of the first processing unit is adjusted on the basis of information obtained from the first antenna element, and
the reference clock is used for timing control of one or more processing unit included in the signal processing section, among the second processing unit and the third processing unit.

6. The antenna apparatus according to claim 1, wherein
the signal processing section has at least the first processing unit and the third processing unit,
a reference clock of the first processing unit is adjusted on the basis of information obtained from the first antenna element, and
the third processing unit sends the position information calculated by the first processing unit and time information based on the reference clock, as the information that pertains to the vehicle.

7. The antenna apparatus according to claim 1, wherein the transceiver unit is covered with the case.

8. The antenna apparatus according to claim 1, wherein the case and the housing are arranged in a positional relationship so as to sandwich a member holding the antenna element section in the vehicle.

9. The antenna apparatus according to claim 1, wherein the signal processing section has the first processing unit and the fifth processing unit,
the imaging unit is disposed inside the case, and
the fifth processing unit adds at least one of the position information calculated by the first processing unit and time information based on a reference clock adjusted by the first processing unit.

10. The antenna apparatus according to claim 1, wherein the position information of the vehicle is used to control another apparatus separate from an information output apparatus for outputting the position information of the vehicle, in the vehicle through the onboard LAN.

11. The antenna apparatus according to claim 1, wherein information on a reference clock of the first processing unit is transmitted to one or more processing unit, included in the signal processing section, among the second processing unit to the fifth processing unit and is then used for timing control, or transmitted through the gateway ECU and is then used for timing control.

12. The antenna apparatus according to claim 1, wherein the transceiver unit is accommodated in the housing.

13. The antenna apparatus according to claim 1, wherein an imaging unit including a camera is disposed inside the case, and
an image processing module for performing image processing on an image signal obtained from the imaging unit and adding at least one of the position information calculated by the first processing unit and time information based on a reference clock adjusted by the first processing unit is disposed in the housing.

14. The antenna apparatus according to claim 1, wherein a reference clock of the first processing unit is adjusted based on information obtained from the first antenna element, and
the reference clock is used for timing control to one or more processing unit, included in the signal processing section, among the second processing unit to the fifth processing unit.

* * * * *